(12) United States Patent
King

(10) Patent No.: US 10,962,211 B2
(45) Date of Patent: Mar. 30, 2021

(54) AUTOMOTIVE LIGHTING DEVICE WITH AN ELECTRICAL WIRING GUIDING MEMBER

(71) Applicant: Valeo North America, Inc., Troy, MI (US)

(72) Inventor: Robert King, Seymour, IN (US)

(73) Assignee: Valeo North America, Inc., Troy, MI (US)

(*) Notice: Subject to any disclaimer, the term of this patent is extended or adjusted under 35 U.S.C. 154(b) by 0 days.

(21) Appl. No.: 16/449,174

(22) Filed: Jun. 21, 2019

(65) Prior Publication Data
US 2020/0400293 A1  Dec. 24, 2020

(51) Int. Cl.
| | |
|---|---|
| *B60Q 1/00* | (2006.01) |
| *F21V 23/00* | (2015.01) |
| *F21S 41/657* | (2018.01) |
| *B60Q 1/04* | (2006.01) |
| *B60Q 1/068* | (2006.01) |

(52) U.S. Cl.
CPC .......... *F21V 23/002* (2013.01); *F21S 41/657* (2018.01); *B60Q 1/045* (2013.01); *B60Q 1/0683* (2013.01)

(58) Field of Classification Search
CPC ........ F21V 23/002; F21V 21/16; F21V 21/14; F21S 41/657; F21S 41/19; F21S 41/65; B60Q 1/045; B60Q 1/0683; B60Q 1/0433
See application file for complete search history.

(56) References Cited

U.S. PATENT DOCUMENTS

| | | | |
|---|---|---|---|
| 4,779,167 A | 10/1988 | Nelson | |
| 2002/0075693 A1* | 6/2002 | Rosenhahn | ........... F21V 23/001 362/513 |
| 2017/0108027 A1 | 4/2017 | Tachiiwa et al. | |
| 2017/0225607 A1* | 8/2017 | Tachiiwa | ............. B60Q 1/0683 362/549 |

(Continued)

FOREIGN PATENT DOCUMENTS

| | | |
|---|---|---|
| DE | 102005015937 A1 | 10/2006 |
| DE | 102005015938 A1 | 1/2007 |
| DE | 102007008646 A1 | 8/2008 |

(Continued)

OTHER PUBLICATIONS

European Patent Office, International Search Report for International Application No. PCT/US2020/038094 dated Nov. 24, 2020.

*Primary Examiner* — Y M. Quach Lee
(74) *Attorney, Agent, or Firm* — Valeo North America, Inc.

(57) ABSTRACT

A lighting device for an automobile comprises a housing, light source for producing a light beam electrically connected to an electrical source by means of electrical wirings, an optical axis adjustment system for adjusting the optical axis of the lighting device having horizontal optical axis adjuster and vertical optical axis adjuster and a pivot point. The lighting device is also provided with an electrical wiring guiding member for guiding the electrical wiring of the lighting device, the electrical wiring guiding member is removably disposed between and attached to the horizontal optical axis adjuster and pivot point. The electrical wiring guiding member comprises attachment portions disposed on opposing ends and a wiring guiding portion disposed there between.

14 Claims, 4 Drawing Sheets

(56) References Cited

U.S. PATENT DOCUMENTS

2019/0271457 A1\* 9/2019 Aoki .................... F21V 23/001
                                                            362/549

FOREIGN PATENT DOCUMENTS

| DE | 102007050348 A1 | 8/2008 |
| DE | 10 2012 102 640 A1 | 10/2013 |
| EP | 0921035 A2 | 6/1999 |

\* cited by examiner

AUTOMOTIVE LIGHTING DEVICE WITH AN ELECTRICAL WIRING GUIDING MEMBER

FIELD OF THE INVENTION

The present invention relates to a lighting device of an automobile, and more particularly to; an electrical wiring guiding member used in a lighting device of an automobile.

BACKGROUND

Lighting devices are used in automobiles and the like, for lighting the path ahead. These lighting devices need to be oriented properly to provide adequate lighting to the driver of the automobile under various driving conditions. Currently, lighting devices are available with multiple optical modules. The optical modules are assembled to a housing of a lighting device by means of connection points, and the optical module is movable relative to the housing to correct the orientation, in particular vertically as well as in azimuth or horizontally.

The optical axis of the optical modules of the lighting devices is typically adjusted using optical module adjustment systems. Conventionally, the optical module adjustment systems have their mounting points (pivot, horizontal adjuster, and vertical adjuster) and also includes one or more wire harness. The adjuster rotates inside the lighting devices to achieve the desired optical axis adjustment. Due to limited space and the rotation of the adjusters inside the lighting devices, can sometimes trap, pinch, cut, or interfere with the wire harness. Thus there is a need to provide a system for lighting device to guide and secure the wire harness without affecting the functionality of the other systems. The present invention is directed one such innovative solution to provide a clear path for the wire harness between optical axis adjusters to allow easier adjustment and to ensure there is no interference or damage to the wire harness or wirings.

Among the literature that may pertain to this technology include the following patent document: DE 102012102640 A1, is incorporated herein by reference for all purposes. The document discloses a wire harness for headlamp that allows latching and removing the attachment but the device as disclosed does not control the wire harness in the most critical area between the optical axis adjuster areas.

SUMMARY OF THE INVENTION

The present invention is directed to a unique solution to one or more of the problems discussed above. It is believed that the present invention provides a unique design that provides the ability for optical axis adjustment system to work efficiently without interference or fouling with the wire harness. Particularly, the present invention provides an electrical wiring guiding member and other features for any number of optical axis adjusters within the lighting device. It is contemplated that the system is tailored for use and disposed between the optical axis adjusters of the lighting device.

Accordingly, pursuant to a first aspect of the present invention, there is contemplated a lighting device for an automobile having optical modules, electrical wirings and an optical axis adjustment system for adjusting the optical axis of the lighting device; an electrical wiring guiding member removably disposed between the optical axis adjusters, for guiding the electrical wiring of the lighting device; attachment portions on each opposing end for attaching the electrical wiring guiding member to optical axis adjusters, the wiring guiding portion disposed between the attachment portions for guiding the electrical wiring.

The invention may be further characterized by one or any combination of the features described herein, such as: the electrical wiring guiding member having an attachment portion that is semi-circular in shape to allow attaching to the ball socket retainers of the at least one horizontal adjuster or the at least one vertical adjuster, wherein, the wiring guiding portion is round in shape with a slotted cut part to form an opening in the wire guiding portion; one end of the slotted cut part of the wiring guiding portion has a tongue shaped projection extending along the wall; the semi-circular shapes of the attachment portion can be oriented in such a way to suit the design requirement of the lighting device; the axis of the attachment portion and the axis of the wiring guiding portion are oriented to form an angle between them in a single plane.

It should be appreciated that the above referenced aspects and examples are non-limiting, as others exist within the present invention, as shown and described herein.

DESCRIPTION OF DRAWINGS

To complete the description and to provide a better understanding of the invention, a set of drawings is provided. Said drawings form an integral part of the description and illustrate an embodiment of the invention, which should not be construed as restricting the scope of the invention, but only as an example of how the invention can be carried out. The drawings comprise the following characteristics.

DETAILED DESCRIPTION OF THE PREFERRED EMBODIMENT

Hereinafter, embodiments of the present invention will be described with reference to the accompanying drawings.

Headlamps of automobiles are known to be available with an optical axis adjustment system which includes a tiltable member such as a reflector assembled to a stationary member (e.g. mounting bracket) of the headlamp by means of three connection points. The tiltable member may be movable relative to the stationary member of the headlamp to correct the orientation of the illuminated beam both horizontally as well as vertically. The three connection points include, a fixed connection point (also known as pivot point) around which the a tiltable member can be rotated; a first connection point by which the tiltable member is vertically movable relative to the stationary member; and a second connection point by which the tiltable member is horizontally movable relative to the stationary member. The first and second connection points include optical axis adjuster attached to nuts supported by the stationary member. The adjusting screws are adapted to move in forward and backward in the axial direction in order to tilt the tiltable member horizontally and/or vertically.

Figure 1:
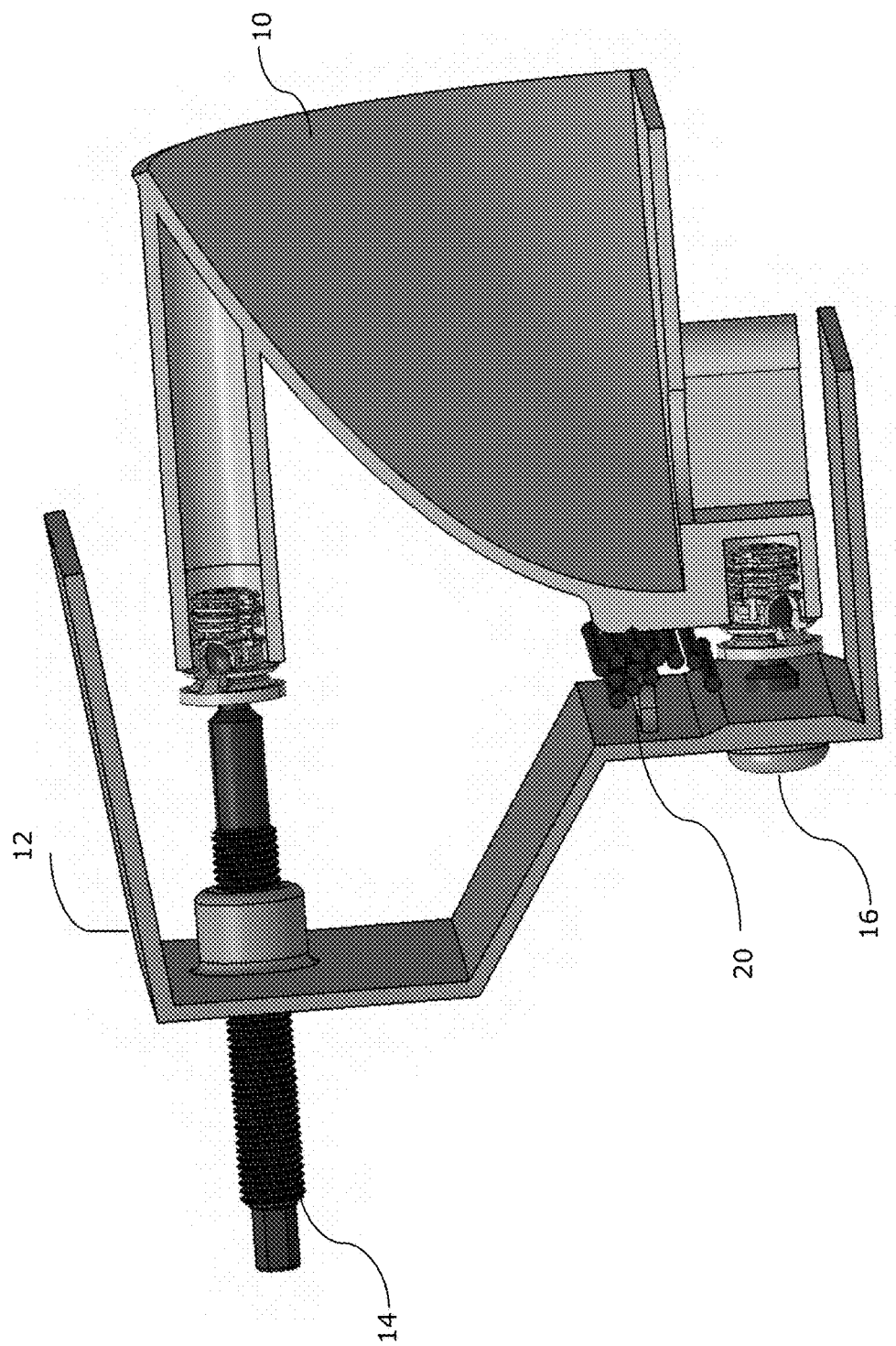
FIG. 1 is an isometric view of an optical axis adjustment system of a headlamp of an automotive vehicle.

FIG. 1 shows one such optical axis adjustment system of a headlamp of an automotive vehicle. The optical axis adjustment system comprises a tiltable member (10), optical axis adjuster (14) and pivot point (16). Additionally, the headlamp also comprises a wire harness (20) which is electrically connected to an electrical source and a light source. The wire harness of the headlamp runs inside the headlamp between the stationary member and the tiltable member.

Figure 2:
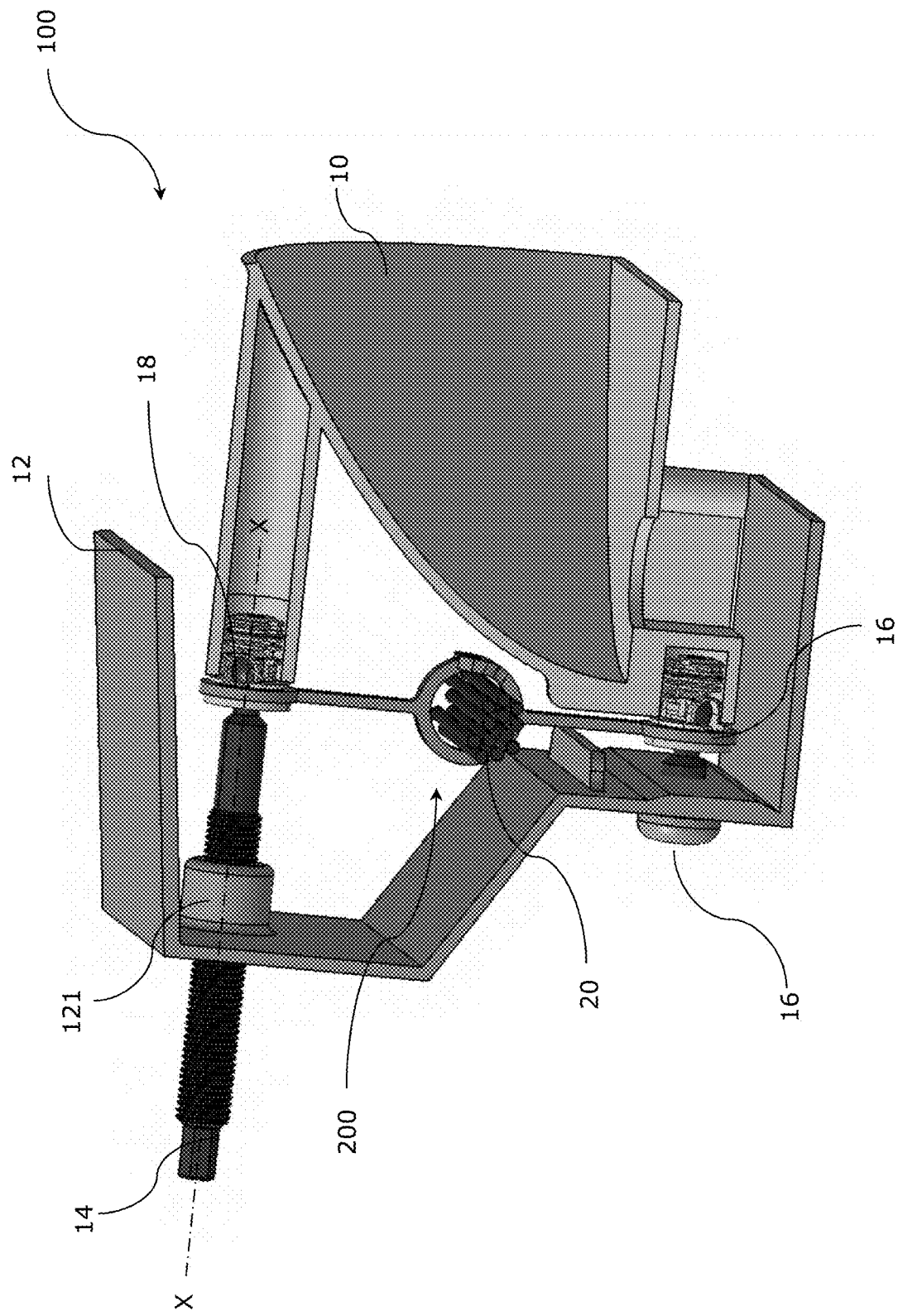
FIG. 2 is an isometric view of an optical axis adjustment system of a headlamp of the present invention. The figure shows an electrical wiring guiding member according to an embodiment of the present invention.

FIG. 2 shows the optical axis adjustment (100) system of a headlamp of an automotive vehicle according to the embodiment of the present invention. The optical axis adjustment (100) shows a titlable member (e.g. reflector) (10) in relation to a supporting member (12). The titable member (10) is connected to the supporting member (12) at three connection point viz. a fixed connection point (pivot point) (16), a first connection point (18a) and a second connection point (for clarity and ease of understanding only one connection point is used to explain the invention, it is understood the same is extendible to the second connection point as well and is not to be deemed as restricting the scope of the invention). The first connection point (18) is in communication with an adjuster (14) which can be operated to adjust the optical axis of the headlamp. The adjuster (14) is a shaft with external threads and passes through the internally threaded slot (121) of the supporting member (12). The adjuster (14) is rotatable along its axis of rotation and due to this motion the adjuster (14) moves along the X-X. The movement causes the first connection (18) to move the tiltable member (10) in relation to the pivot point (16). The figure further shows the electrical wiring guiding member (200) snap fitted on to the ball socket retainers of the pivot point (16) and the first connection point (18) of the axis adjustment system of the vehicle headlamp.

Figure 3:
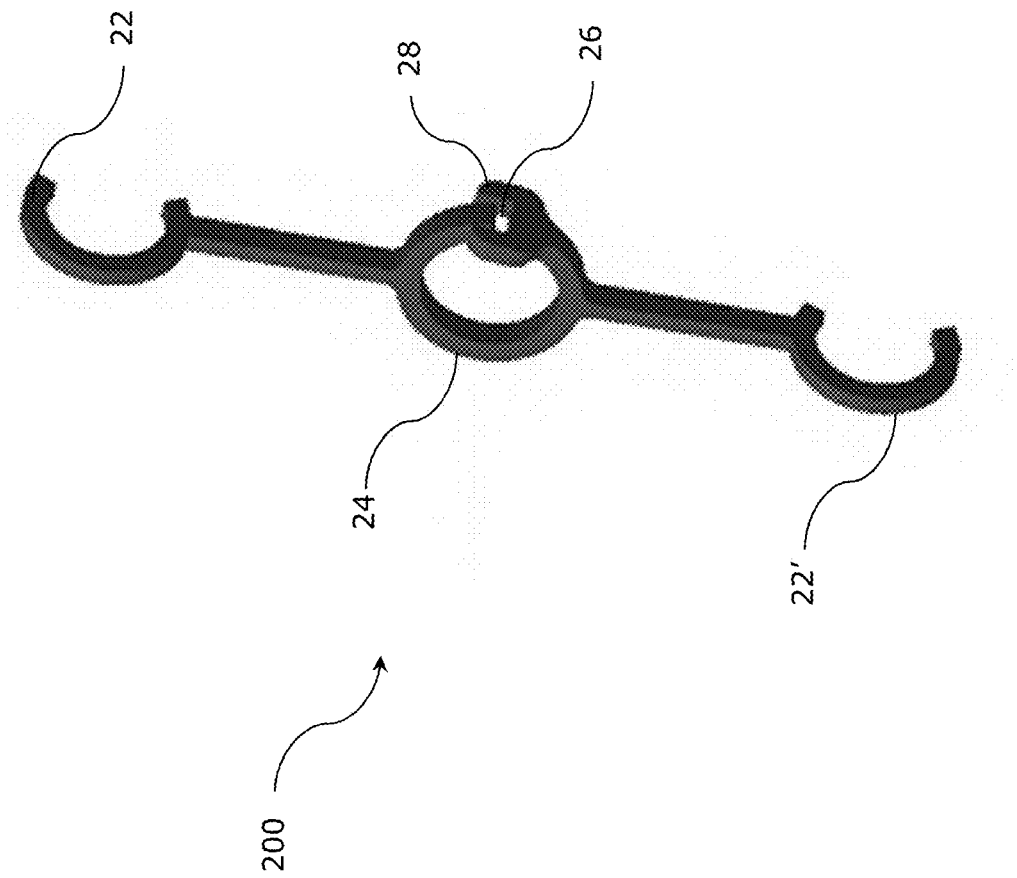
FIG. 3 shows the electrical wiring guiding member of FIG. 2 as per the present invention. The figure further shows the attaching portion and guiding portion of the electrical wiring guiding member.

FIG. 3 shows the electrical wiring guide member (200) of FIG. 2. The electrical wiring guide member (200) comprises at least two attachment portions (22, 22') which are semi-circular in shape. The attachment portions (22, 22') are designed to be snap fitted to the ball socket retainers of the pivot point (16) and the first connection point (18). Alternatively, the electrical wiring guide member (200) can also be attached between pivot point (16) and second connection point (not shown) or between first connection point (18) and second connection point (not shown). The electrical wiring guide member (200) can be attached using any other attachment methods such as screws, trap, welds, or similar methods. The electrical wiring guide member (200) comprises a wiring guide portion (24) disposed between the at least two attachment portions (22, 22'). The wiring guide portion (24) is round in shape and is provided with a slotted cut part (26) to form an opening in the wire guide portion (24). The slotted cut part (26) allows the wiring guide portion (24) to be bent to open and accept the wire harness (20) (shown in FIG. 2). Additionally, a tongue shaped projection (28) extending along its wall of the slotted cut part (26) is provided to prevent the wire harness (20) from slipping out of the electrical wiring guide portion (24) of the electrical wiring guide member (200). The slotted cut part (28) also provides the flexibility needed to accommodate the change in distance between the pivot point (16) and the connection points during headlamp aim process. The wiring guide portion (24) is preferably formed from a rigid plant or polymeric composition but may be constructed from any conventionally suitable material.

Figure 4:
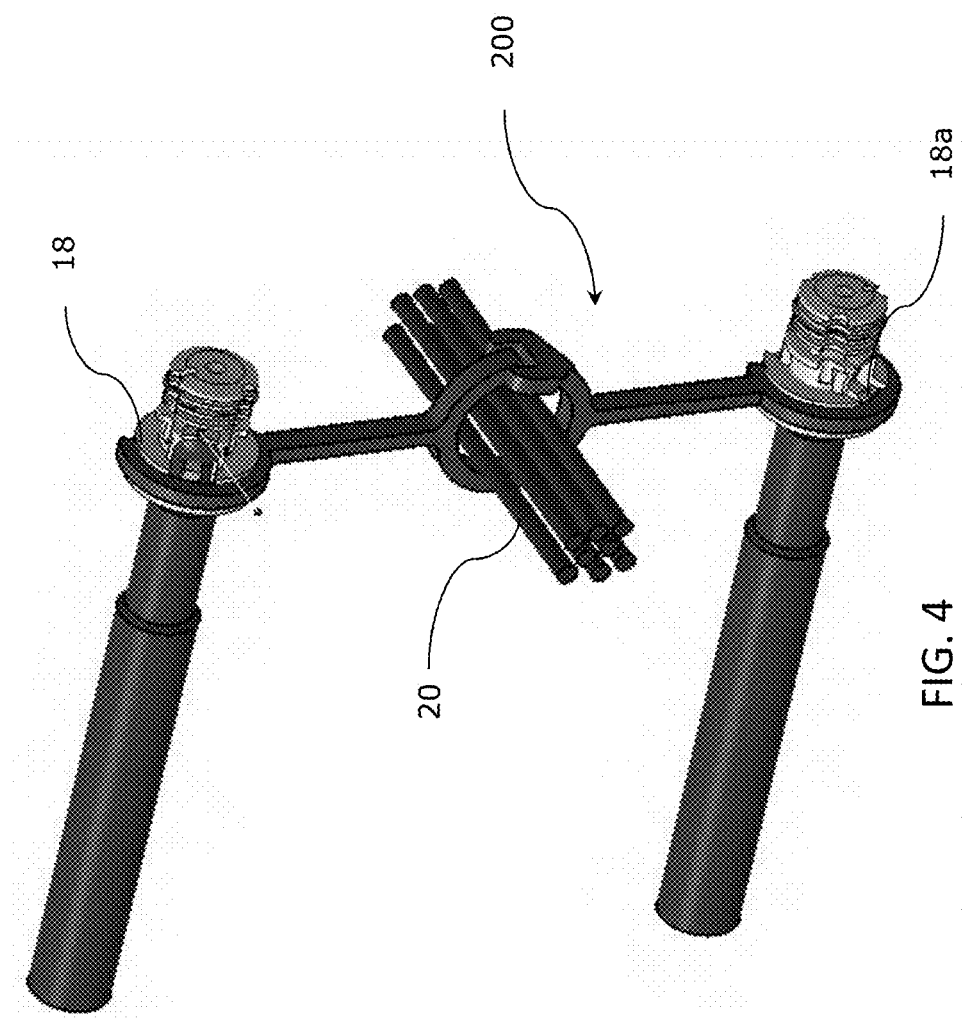
FIG. 4 shows the electrical wiring guiding member of FIG. 2 along with the optical axis adjuster and the electrical wiring harness.

FIG. 4, shows the electrical wiring guiding member (200) connected between first connection point (18) and second connection point (18a) as per one of the embodiments of the present invention. Apart from the change in the location of attachment of the electrical wiring member (200), the process and the working methodology remains the same.

In another embodiment of the present invention, the electrical wiring guiding member (200) can have multiple attachment portions to enable the system to be used for guiding multiple wire harness (20) based on the requirement without deviating from the scope of the invention. Also, the attachment portions (22, 22') and the wire guiding portion (24) can be oriented at any angle between the reference planes. As an embodiment and as shown in FIG. 3, attachment portions (22, 22') and the wire guiding portion (24) are oriented perpendicular to each other and another embodiment can be in the same plane.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

What is claimed is:

1. A lighting device for an automobile comprising:
a housing;
electrical wirings electrically connected to a light source and to an electrical source;
an optical axis adjustment system for adjusting an optical axis of the lighting device, the optical axis adjustment system having at least one horizontal optical axis adjuster, at least one vertical optical axis adjuster and a pivot point; and
at least one electrical wiring guide member for guiding the electrical wiring of the lighting device, the at least one electrical wiring guide member is removably disposed between and attached to the at least one horizontal optical axis adjuster and the pivot point; and
wherein the at least one electrical wiring guide member comprises;
at least two attachment portions disposed on opposing ends for attaching the at least one electrical wiring guide member to the at least one horizontal optical axis adjuster and the pivot point respectively, and a wiring guide portion disposed between the at least two attachment portions.

2. The lighting device as claimed in claim 1, wherein at least one of the at least two attachment portions is semicircular in shape to allow attaching to a ball socket retainers of the at least one horizontal adjuster or the pivot point.

3. The lighting device as claimed in claim 2, wherein the semi-circular shapes of the at least one of the at least two attachment portions are oriented in the same direction.

4. The lighting device as claimed in claim 3, wherein an axis of the at least two attachment portions and an axis of the wiring guide portion are oriented to form an angle between them in a single plane.

5. The lighting device as claimed in claim 2, wherein the semi-circular shapes of the at least one of the at least two attachment portions are oriented in opposite direction.

6. The lighting device as claimed in claim 5, wherein an axis of the at least two attachment portions and an axis of the wiring guide portion are oriented to form an angle between them in a single plane.

7. The lighting device as claimed in claim 2, wherein an axis of the at least one of the at least two attachment portions and an axis of the wiring guide portion are oriented to form an angle between them in a single plane.

8. The lighting device as claimed in claim 1, wherein the wiring guide portion is round in shape with a slotted cut part to form an opening in the wiring guide portion.

9. The lighting device as claimed in claim 8, wherein one end of the slotted cut part has a tongue shaped projection extending along its wall.

10. The lighting device as claimed in claim 9, wherein an axis of the at least two attachment portions and an axis of the wiring guide portion are oriented to form an angle between them in a single plane.

11. The lighting device as claimed in claim 8, wherein the axis of the at least two attachment portions and an axis of the wiring guide portion are oriented to form an angle between them in a single plane.

12. The lighting device as claimed in claim 1, wherein the wiring guide member is snap-fitted to the at least one horizontal optical axis adjuster and the pivot point.

13. The lighting device as claimed in claim 1, wherein an axis of the at least two attachment portions and an axis of the wiring guide portion are oriented to form an angle between them in a single plane.

14. A method for assembling a lighting device comprising:

providing an optical axis adjustment system having at least one horizontal optical axis adjuster and at least one vertical optical axis adjuster for adjusting an optical axis of the lighting device;

placing at least one electrical wiring guide member that is removably disposed between and attached to the at least one horizontal optical axis adjuster and a pivot point for guiding the at least one electrical wiring of the lighting device; and placing an electrical wiring harness through the at least one electrical wiring guide member, wherein at least two attachment portions are disposed on opposing ends of the at least one electrical wiring guide member for attaching the at least one electrical wiring guide member to the at least one horizontal optical axis adjuster and the at least one vertical optical axis adjuster, respectively; and a wiring guide portion is disposed between the at least two attachment portions.

\* \* \* \* \*